Patented Feb. 14, 1933

1,897,422

UNITED STATES PATENT OFFICE

ADOLF DULITZ, OF WIESBADEN, AND JULIUS STAWITZ, OF WIESBADEN-BIEBRICH, GERMANY, ASSIGNORS TO KALLE & CO. AKTIENGESELLSCHAFT, OF WIESBADEN-BIEBRICH, GERMANY

CAPSULE MADE OF CELLULOSE ESTERS AND PROCESS FOR PREPARING IT

No Drawing. Application filed September 19, 1929, Serial No. 393,840, and in Germany September 27, 1928.

The present invention relates to capsules made of cellulose esters, capable of being stored in the air without shrinking, and a process of preparing them.

According to the invention, capsules made of cellulose esters which may be stored in the air without shrinking and which regain their ability to shrink by a treatment with water can be prepared in the following simple manner:

A water-swollen capsule which can be cut and impressed in any desired manner is prepared in the usual way. Said capsule is immersed in a water-soluble, non-volatile liquid which has not a greater swelling action upon the cellulose ester than water, for instance glycerine (of 28° Bé.). In about a quarter of an hour an exchange of the water with which the capsule is swollen for the impregnating liquid in question occurs without any alteration of the properties of the capsule in regard to its appearance, size, or its capability of shrinking after a treatment with water taking place. The water which superficially adheres to the moist capsule immediately forms, when combined with the impregnating liquid, a diluted aqueous solution. By said solution a uniform exchange is started, i. e. said solution causes the water contained in the capsule not to leave it more quickly than the more viscous impregnating agent can penetrate between the single cellulose molecule aggregates. After the impregnation is complete, the externally adhering parts of the liquid are eliminated by centrifuging or by other suitable means. In this state the capsule can be stored without undergoing any shrinkage and without deteriorating otherwise. Before use the capsule is immersed for a short time in water, as a result of which the impregnating liquid in question is again replaced by water. The moist capsule thus re-obtained is drawn onto the container to be sealed where it effects a perfectly tight closure after the water has dried off.

With some impregnating liquids the thin hyaloid membrane which adheres externally to the capsule is not sufficient to obtain a uniform exchange of the water which makes the capsule swell up for the impregnating liquid. If, for instance, a moist capsule is immersed in the mono-glycerine ester of lactic acid, the capsule immediately shrinks, because the water leaves the micellar spaces more quickly than the more viscous impregnating agent can penetrate. The uniform exchange which is required for maintaining the degree of swelling up is obtained in this case by first immersing the moist capsules in a dilute aqueous solution of the impregnating agent or in an aqueous salt solution (for instance a NaCl-solution of 30% strength) and then immersing them in the proper impregnating bath.

The chief difference between the described process for cellulose ester and the known processes for cellulose which are also partly worked with the aid of glycerine thus consists in impregnating with non-volatile liquids which are as anhydrous as possible and not with the aid of aqueous solutions.

By this process the result is attained that the degree of swelling up of the moist initial stage is not diminished either during the impregnating process or during the subsequent storage in the air or finally during the watering process before use. As a result furthermore of the fact that only such liquids as have not a greater swelling action upon the cellulose ester than water are chosen, the possibility is avoided that the degree of swelling up is increased during the impregnating process, which would result in too great softness and in the disadvantage that the capsules would be too easily deformed.

Suitable impregnating liquids are for instance: glycerine (28° Bé.), polygloycol, commercial sorbite, the mono-glycerine ester of lactic acid and mixtures thereof.

The following examples serve to illustrate the invention:

1. A water-moist bottle capsule made of acetyl cellulose is immersed for about half an hour in glycerine of 28° Bé., then taken out and freed from the greatest part of the externally adhering glycerine by centrifugation.

2. A water-moist bottle capsule made of acetyl cellulose is first immersed for a quarter of an hour in a preliminary bath consisting of a mixture of 50 parts of mono-glycerine ester of lactic acid and 50 parts of water, then taken out and immersed for half an hour in the impregnating bath proper consisting of mono-glycerine ester of lactic acid without any addition of water. When the capsule has been taken out of the bath the externally adhering parts of the impregnating liquid are caused to run off.

3. In an analogous manner as in Example 2 a preliminary bath containing 30 per cent of sodium chloride instead of mono-glycerine ester of lactic acid is used and the subsequent impregnating bath consists of a mixture of 50 parts of technical polyglycol and of 50 parts of glycerine of 28° Bé.

We claim:

1. The process of preparing swollen capsules of cellulose esters, capable of being stored without shrinking, which comprises immersing water-swollen capsules of cellulose esters in a water-soluble, difficultly volatile liquid, which is chemically indifferent to cellulose esters and whose swelling action upon cellulose esters is at the most equal to that of water, thereby effecting an exchange of the impregnating liquid for the water contained in the water-swollen capsules.

2. The process of preparing swollen capsules of cellulose esters, capable of being stored without shrinking, which comprises first immersing water-swollen capsules of cellulose esters in an aqueous solution of a difficultly volatile liquid, which is chemically indifferent to cellulose esters and whose swelling action upon cellulose esters is at the most equal to that of water, and then immersing the capsules so treated in a non-aqueous, difficultly volatile liquid of the kind defined, thereby effecting an exchange of the impregnating liquid for the water contained in the water-swollen capsules.

3. The process of preparing swollen capsules of acetyl cellulose, capable of being stored without shrinking, which comprises immersing water-swollen capsules of acetyl cellulose in a water-soluble, difficultly volatile liquid of the group consisting of glycerine, polyglycol, sorbite, the mono-glycerine ester of lactic acid and mixtures thereof, thereby effecting an exchange of the impregnating liquid for the water contained in the water-swollen capsules.

4. The process of preparing swollen capsules of acetyl cellulose, capable of being stored without shrinking, which comprises first immersing water-swollen capsules of acetyl cellulose in an aqueous solution of a difficultly volatile liquid of the group consisting of glycerine, polyglycol, sorbite, the mono-glycerine ester of lactic acid and mixtures thereof, and then immersing the capsules so treated in a non-aqueous, difficultly volatile liquid of the group above defined, thereby effecting an exchange of the impregnating liquid for the water contained in the water-swollen capsules.

5. The process of preparing swollen capsules of cellulose esters, capable of being stored without shrinking, which comprises immersing water-swollen capsules of cellulose esters in glycerine, thereby effecting an exchange of glycerine for the water contained in the water-swollen capsules.

6. The process of preparing swollen capsules of acetyl cellulose, capable of being stored without shrinking, which comprises immersing water-swollen capsules of acetyl cellulose in glycerine, thereby effecting an exchange of glycerine for the water contained in the water-swollen capsules.

7. As a new product, a swollen capsule of a cellulose ester, capable of being stored without shrinking, said capsule containing a water-soluble, difficultly volatile liquid, which is chemically indifferent to the cellulose ester and whose swelling action upon the cellulose ester is at the most equal to that of water.

8. As a new product, a swollen capsule made of acetyl cellulose, capable of being stored without shrinking, said capsule containing a water-soluble, difficultly volatile liquid of the group consisting of glycerine, polyglycol, sorbite, the mono-glycerine ester of lactic acid and mixtures thereof.

9. As a new product, a swollen capsule made of a cellulose ester, capable of being stored without shrinking, said capsule having been impregnated with glycerine.

10. As a new product, a swollen capsule made of acetyl cellulose, capable of being stored without shrinking, said capsule having been impregnated with glycerine.

In testimony whereof, we affix our signatures.

ADOLF DULITZ.
JULIUS STAWITZ.